United States Patent
Morikawa et al.

(10) Patent No.: US 8,935,521 B2
(45) Date of Patent: Jan. 13, 2015

(54) CONTROL APPARATUS, METHOD OF CONTROLLING CONTROL APPARATUS, AND DIGITAL BROADCAST RECEIVING APPARATUS

(75) Inventors: Masanobu Morikawa, Osaka (JP); Shuichi Takayama, Hyogo (JP)

(73) Assignee: Panasonic Corporation, Osaka (JP)

( * ) Notice: Subject to any disclaimer, the term of this patent is extended or adjusted under 35 U.S.C. 154(b) by 258 days.

(21) Appl. No.: 13/568,464

(22) Filed: Aug. 7, 2012

(65) Prior Publication Data

US 2012/0304242 A1 Nov. 29, 2012

Related U.S. Application Data

(63) Continuation of application No. PCT/JP2011/000393, filed on Jan. 26, 2011.

(30) Foreign Application Priority Data

Feb. 10, 2010 (JP) ................................. 2010-027516

(51) Int. Cl.
*G06F 15/177* (2006.01)
*G06F 9/00* (2006.01)
*H04N 5/14* (2006.01)
*H04N 5/44* (2011.01)
*G06F 13/24* (2006.01)
*G06F 3/00* (2006.01)
(Continued)

(52) U.S. Cl.
CPC ....... *H04N 21/4345* (2013.01); *H04N 21/4383* (2013.01); *H04N 21/4432* (2013.01); *G06F 9/4406* (2013.01)
USPC ................... 713/2; 713/1; 348/571; 348/725; 710/260; 725/37; 725/131

(58) Field of Classification Search
CPC .......................... H04N 21/4345; G06F 9/4406
USPC ................... 713/1, 2; 348/571, 725; 710/260; 725/37, 131
See application file for complete search history.

(56) References Cited

U.S. PATENT DOCUMENTS 6,253,320 B1 * 6/2001 Sekiguchi et al. ................ 713/2
7,385,631 B2 * 6/2008 Maeno et al. ............. 348/207.99
(Continued)

FOREIGN PATENT DOCUMENTS

| CN | 1599452 A | 3/2005 |
| CN | 101277407 A | 10/2008 |

(Continued)

OTHER PUBLICATIONS

International Search Report issued Feb. 22, 2011 in International Application No. PCT/JP2011/000393.
(Continued)

*Primary Examiner* — Stefan Stoynov
(74) *Attorney, Agent, or Firm* — Wenderoth, Lind & Ponack, L.L.P.

(57) ABSTRACT

A control apparatus which is inexpensive and highly effective in shortening a start-up time, a method of controlling the control apparatus, and a digital broadcast receiving apparatus are provided. The control apparatus includes: a control microcomputer; at least one device; and a ROM which stores a simple control program, a main body program, and a boot loader. The simple control program includes an interrupt program having an interrupt for starting the at least one device so that the at least one device is activated, accepts an interrupt signal requesting for the interrupt from the at least one device during loading of the main body program, and performs the interrupt.

12 Claims, 8 Drawing Sheets

(51) Int. Cl.
*H04N 7/173* (2011.01)
*H04N 21/434* (2011.01)
*H04N 21/438* (2011.01)
*H04N 21/443* (2011.01)
*G06F 9/44* (2006.01)

(56) References Cited

U.S. PATENT DOCUMENTS

| | | | |
|---|---|---|---|
| 8,392,944 B2 * | 3/2013 | Jung et al. | 725/38 |
| 2007/0076130 A1 | 4/2007 | Fukushima | |

FOREIGN PATENT DOCUMENTS

| | | |
|---|---|---|
| JP | 2003-115775 | 4/2003 |
| JP | 2006-262090 | 9/2006 |
| JP | 2007-104083 | 4/2007 |
| JP | 2007-311958 | 11/2007 |
| JP | 2010-28447 | 2/2010 |

OTHER PUBLICATIONS

Office Action issued Aug. 4, 2014 in corresponding Chinese Application No. 201180008805.5 (with partial English translation).

* cited by examiner

FIG. 3

| Group for INTC | Interrupt level |
|---|---|
| Tuner unit | High level |
| Demultiplexer | High level |
| Decoding unit | Disable interrupt |
| Decoder unit | Disable interrupt |
| AV output control unit | Disable interrupt |

~301

| Interrupt level | Jump address |
|---|---|
| High level | Simple control program |
| Low level | N/A |

| Group for INTC | Interrupt level |
|---|---|
| Tuner unit | High level |
| Demultiplexer | High level |
| Decoding unit | Low level |
| Decoder unit | Low level |
| AV output control unit | Low level |

~501

| Interrupt level | Jump address |
|---|---|
| High level | Simple control program |
| Low level | OS |

| Group for INTC | Interrupt level |
|---|---|
| Tuner unit | Low level |
| Demultiplexer | Low level |
| Decoding unit | Low level |
| Decoder unit | Low level |
| AV output control unit | Low level |

~801

| Interrupt level | Jump address |
|---|---|
| High level | (don't care) |
| Low level | OS |

~802

CONTROL APPARATUS, METHOD OF CONTROLLING CONTROL APPARATUS, AND DIGITAL BROADCAST RECEIVING APPARATUS

CROSS REFERENCE TO RELATED APPLICATION

This is a continuation application of PCT Patent Application No. PCT/JP2011/000393 filed on Jan. 26, 2011, designating the United States of America, which is based on and claims priority of Japanese Patent Application No. 2010-027516 filed on Feb. 10, 2010. The entire disclosures of the above-identified applications, including the specifications, drawings and claims are incorporated herein by reference in their entirety.

TECHNICAL FIELD

The present invention relates to control apparatuses for receiving digital broadcast, a method of controlling the control apparatuses, and digital broadcast receiving apparatuses.

BACKGROUND ART

In resent years, an operating system (OS) and software for an application, which are for digital broadcast receiving apparatuses such as a digital TV, have increased in size for high functionality and multi functionality. Because of this, it takes a longer time for software loading and initialization, and a user has to wait after turning on an apparatus to actually start viewing.

Therefore, in order to provide greater convenience to users, a technique is required for shortening the waiting time after the user turns on the apparatus to start viewing (see Patent Literatures (PTL) 1 and 2, for example).

PTL 1 discloses a technique for shortening the waiting time after the user turns on the apparatus to start viewing. In the technique, processing which is related to the digital broadcast and other processing are started in parallel, by (i) executing processing, which is independent from operation of the OS which is related to the digital broadcast, namely control of a tuner unit, a demultiplexer, and a decoding unit, by a first system controller and (ii) executing start-up of the OS and a full service by a second system controller.

PTL 2 also discloses a technique for shortening the waiting time after the user turns on the apparatus to start viewing, by (i) executing processing related to the digital broadcast in advance by processing which requires software in a small size that is called partial service providing task and (ii) succeeding the processing from the partial service providing task started in advance after the start-up of a full service providing task.

CITATION LIST

Patent Literature

[PTL 1] Japanese Unexamined Patent Application Publication No. 2006-262090
[PTL 2] Japanese Unexamined Patent Application Publication No. 2003-115775

SUMMARY OF INVENTION

Technical Problem

However, the technique in PTL 1 has a problem that the costs for hardware are increased because two independent system controllers are required. The technique in PTL 2 also has a problem that the effect in shortening the start-up time is small, which is because it is required to start the OS prior to the operation of the partial service providing task and therefore the OS and the partial service providing task cannot be operated in parallel while the OS is being started.

The present invention is conceived to solve the above problems, and has an object to provide a control apparatus which is inexpensive and highly effective in shortening the start-up time, a method of controlling the control apparatus, and a digital broadcast receiving apparatus.

Solution to Problem

In order to solve the above problems, a control apparatus in an aspect of the present invention includes: a control microcomputer; at least one device connected to the control microcomputer; and a ROM which stores a first control program, a second control program which is used for controlling the control microcomputer, and a boot loader program for loading the second control program into the control microcomputer upon start-up. The first control program includes an interrupt program having an interrupt for starting the at least one device so that the at least one device is activated, and the control microcomputer executes the boot loader program so that the second control program is loaded from the ROM, accepts an interrupt signal requesting for the interrupt from the at least one device during the loading of the second control program, and performs the interrupt.

Advantageous Effects of Invention

With the present invention, a control apparatus which is inexpensive and highly effective in shortening the start-up time, a method of controlling the control device, and a digital broadcast receiving device can be provided.

BRIEF DESCRIPTION OF DRAWINGS

These and other objects, advantages and features of the invention will become apparent from the following description thereof taken in conjunction with the accompanying drawings that illustrate a specific embodiment of the present invention. In the Drawings:

FIG. 3 is an interrupt table set upon start-up of the boot loader;
FIG. 5 is an interrupt table set immediately after the start-up of an OS;
FIG. 8 is an interrupt table set immediately after the start-up of a program on the OS.

DESCRIPTION OF EMBODIMENT

Embodiment 1

The following describes an embodiment of the present invention with reference to drawings. Although the present invention is described using the embodiment below and the attached drawings, it is for illustrative purposes and therefore it should not be construed that the present invention is determined by the embodiment and the drawings.

A digital broadcast receiving apparatus which is an aspect of the control apparatus according to the embodiment of the present invention is described. The digital broadcast receiving apparatus described in the present embodiment includes: a control microcomputer; at least one device connected to the control microcomputer; and a ROM which stores a first control program, a second control program which is used for controlling the control microcomputer, and a boot loader program for loading the second control program into the control microcomputer upon start-up. The first control program includes an interrupt program having an interrupt for starting the at least one device so that the at least one device is activated, and the control microcomputer executes the boot loader program so that the second control program is loaded from the ROM, accepts an interrupt signal requesting for the interrupt from the at least one device during the loading of the second control program, and performs the interrupt. With the above configuration, a control apparatus can be provided which does not require two control microcomputers to be prepared as system controllers, executes device control by the interrupt using the first control program prior to loading of the second control program (OS, for example), and continuously executes the device control by the interrupt through the first control program even during the loading of the second control program. With such a control apparatus, load of OS and control of device can be executed in parallel. Furthermore, since there is no need to prepare two control microcomputers as system controllers, the costs for hardware are not increased.

Figure 1:
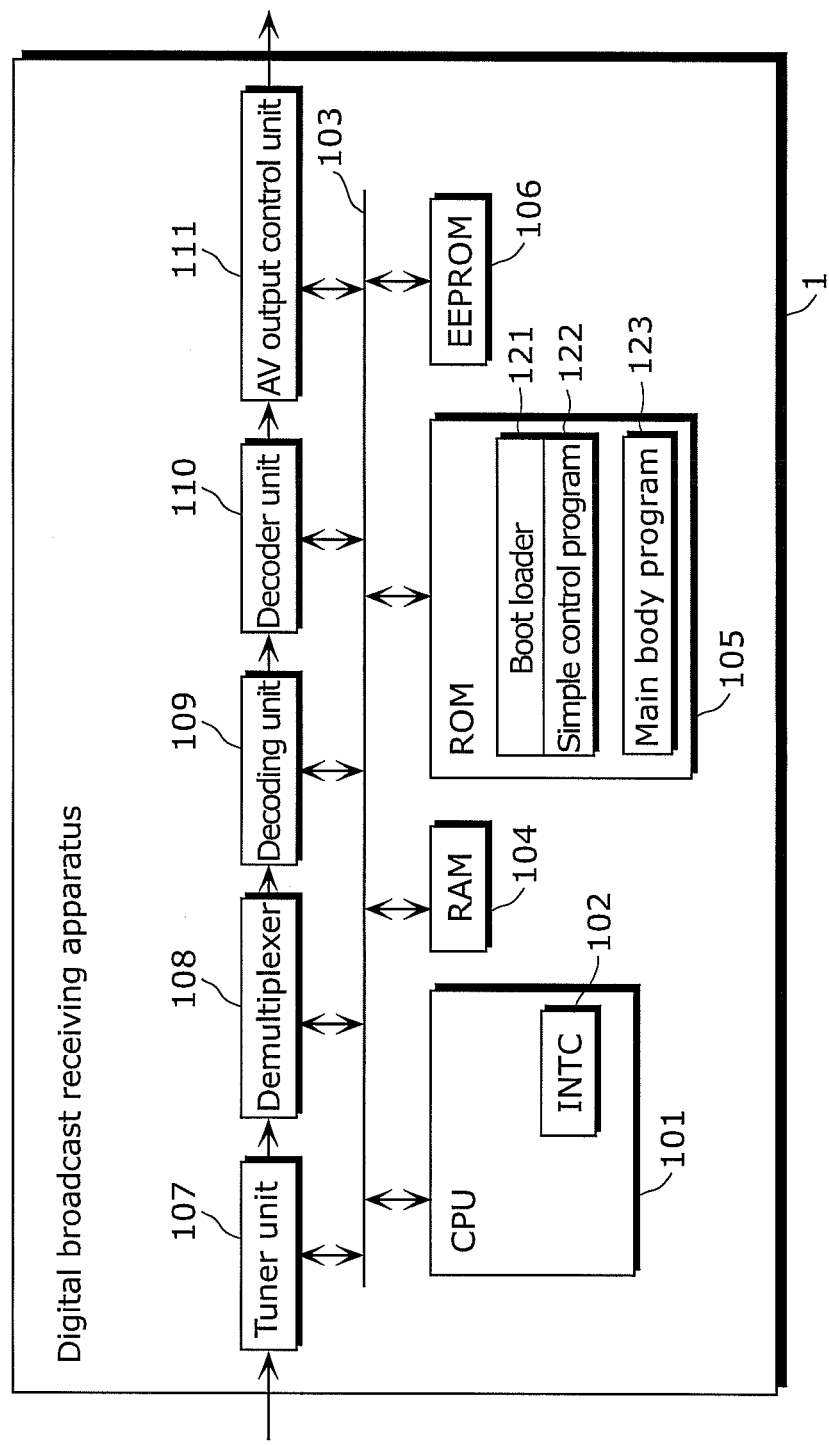
FIG. 1 is a block diagram showing a configuration of a digital broadcast receiving apparatus according to an embodiment of the present invention.

FIG. 1 is a block diagram showing a configuration of a digital broadcast receiving apparatus 1 according to the present embodiment. A CPU 101 in the present embodiment corresponds to the control microcomputer. The CPU 101 includes an interrupt controller (INTC) 102, and is connected to a general-purpose bus 103.

Furthermore, each of a RAM 104, a ROM 105, an EEPROM 106, a tuner unit 107, a demultiplexer 108, a decoding unit 109, a decoder unit 110, and an AV output control unit 111, are connected to the general-purpose bus 103. Here, the tuner unit 107, the demultiplexer 108, the decoding unit 109, the decoder unit 110, and the AV output control unit 111 in the present embodiment correspond to the devices.

The interrupt controller 102 in the present embodiment corresponds to an interrupt driving unit. Upon receiving an interrupt signal from at least one of the tuner unit 107, the demultiplexer 108, the decoding unit 109, the decoder unit 110, and the AV output control unit 111, the interrupt controller 102 (i) executes processing assigned with a high interrupt level with higher priority, based on the interrupt table set for each of the above devices and (ii) transits the processing of the CPU 101 to a jump address associated with each interrupt level. The interrupt signal is a signal for executing the processing with higher priority than other processing. Since the CPU 101 processes the interrupt by the interrupt controller 102, the interrupt can be simplified. It is to be noted that the interrupt table is an interrupt address table which holds a jump address indicating the beginning of the interrupt program. The interrupt table is described in detail later.

The RAM 104 is a storage area for the CPU 101, the tuner unit 107, the demultiplexer 108, the decoding unit 109, the decoder unit 110, and the AV output control unit 111.

Furthermore, the ROM 105 stores: a boot loader 121; a simple control program 122 which is started based on the interrupt table included in the boot loader 121 and controls each device to process the interrupt; and a main body program 123 which is for controlling the OS and each device of the digital broadcast receiving apparatus 1. Here, the boot loader 121 in the present embodiment corresponds to the boot loader program, the simple control program 122 in the present embodiment corresponds to the first control program, and the main body program 123 in the present embodiment corresponds to the second control program. Furthermore, the simple control program 122 includes an interrupt program having the interrupt for starting and activating the devices. The devices include the tuner unit 107, the demultiplexer 108, the decoding unit 109, the decoder unit 110, and the AV output control unit 111.

The CPU 101 executes the boot loader 121 so that the simple control program 122 is loaded from the ROM 105, sets the interrupt table, accepts the interrupt signal requesting for the interrupt from the devices during the loading of the simple control program 122, and processes the interrupt. The devices include the tuner unit 107, the demultiplexer 108, the decoding unit 109, the decoder unit 110, and the AV output control unit 111. Since the CPU 101 specifies the jump address table indicating the beginning of the interrupt program so that the interrupt signal can be accepted in the above manner, the waiting time after the user turns on the apparatus to start viewing can be shortened. Furthermore, the start-up of the device can be continued through the main body program 123 that is an OS.

Furthermore, the EEPROM 106 stores the frequency setting of the last channel that is the channel the user viewed in the end of the previous start-up of the apparatus.

When the reception frequency for the digital broadcast is set by the CPU 101, the tuner unit 107 starts orthogonal frequency-division multiplexing (OFDM) synchronization, and when the OFDM synchronization is completed, transmits (assets) an interrupt signal to the interrupt controller 102 and starts outputting transport stream (TS). Here, the transport stream is a form of multiplexing and transmitting or accumulating packetized elementary stream (PES) obtained by packetizing elementary stream (ES), which is coded-video or coded-audio. Each transport stream includes information called packet identifier (PID value).

The demultiplexer 108 receives the transport stream outputted from the tuner unit 107, and stores the packet in the RAM 104 set in advance by the CPU 101 based on the packet identifier (PID value) included in the transport stream. After storing the packet identifier (PID value) to the RAM 104, the demultiplexer 108 transmits (asserts) an interrupt signal to the interrupt controller 102. Furthermore, when receiving the packet identifier (PID value) of VideoES (coded video information), the demultiplexer 108 outputs the encrypted VideoES, and when receiving AudioES (coded audio information), the demultiplexer 108 outputs the encrypted AudioES, to the decoding unit 109.

The decoding unit 109 decodes the encrypted VideoES and the encrypted AudioES, and outputs data-compressed video signal and data-compressed audio signal to the decoder unit 110. The decoder unit 110 decompresses the data-compressed VideoES and the data-compressed AudioES, and transforms the decompressed VideoES into a video signal and the decompressed AudioES into an audio signal. Furthermore, the AV output control unit 111 transforms the video signal and the audio signal outputted from the decoder unit 110 into a form of a panel or an external output terminal (not shown in the drawings), and outputs the transformed video signal and the transformed audio signal.

With the above processing, the user can view the output of video signal and audio signal.

Figure 2:
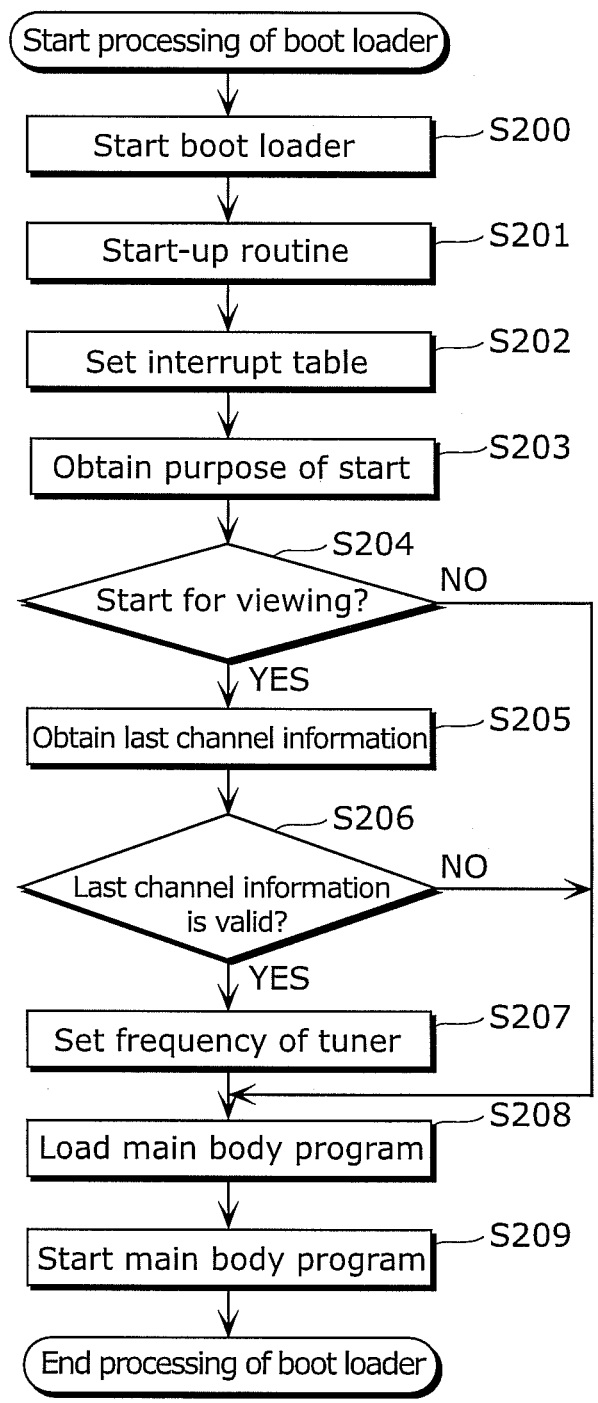
FIG. 2 is a flowchart showing processing of a boot loader.

Next, an operation of the digital broadcast receiving apparatus 1, which is performed after the user turns on the apparatus to start viewing, is described with reference to FIG. 2 and FIG. 3. FIG. 2 is a flowchart describing processing of the boot loader 121, and FIG. 3 is an interrupt table set upon the start-up of the boot loader 121.

The boot loader 121 executes an initial control sequence for starting each device, upon the start-up of the digital broadcast receiving apparatus 1 (upon booting after the apparatus is turned on).

First, when the digital broadcast receiving apparatus 1 is turned on, each device is turned on, the CPU 101 is reset, and the boot loader 121 stored in the ROM 105 is started (step S200).

Next, an initialization, such as setting of a bus connected to the CPU 101, is performed through a start up routine (step S201). Furthermore, the interrupt table is set (step S202).

Here, as shown in FIG. 3, the interrupt table includes two tables. One is an interrupt level list 301 which holds a type of an input device and an interrupt level associated with the type. The other is a jump address list 302 which holds the interrupt level and a jump address indicating a beginning of an interrupt program associated with the interrupt level. It is to be noted that the jump address list 302 in the present embodiment corresponds to the jump address table.

In the interrupt level list 301, the tuner unit 107 and the demultiplexer 108 are assigned with high interrupt level, and the CPU 101 is set to accept the interrupt signal from each of these devices. Other devices are set to be disabled to interrupt. Furthermore, in the jump address list 302, an address of the simple control program 122 stored in the ROM 105 is set as the jump address of a program for processing the interrupt for the high level interrupt. Thus, the simple control program 122 is called from the ROM 105 in response to the interrupt signal from each of the tuner unit 107 and the demultiplexer 108, the tuner unit 107 and the demultiplexer 108 are made to be able to accept the interrupt signal, so that the CPU 101 process the interrupt through the simple control program 122.

Although the group for interrupt controller in the interrupt level list 301 includes the tuner unit 107, the demultiplexer 108, the decoding unit 109, the decoder unit 110, and the AV output control unit 111, this is for convenience in describing the present invention. If other devices are connected to the CPU 101, the interrupt level is also set for those devices. Also, although the type of the interrupt level includes two types, namely high and low, the interrupt level is not necessarily be limited to two levels and more levels may be set.

Next, a purpose of start of the digital broadcast receiving apparatus 1 is obtained (step S203). The purpose of start can be obtained by a sub-microcomputer (not shown in the drawings). As the purpose of start, it is determined whether the digital broadcast receiving apparatus 1 is turned on by receiving a signal from a button provided in the main body or a remote control, or by an embedded timer at a predetermined time point. The sub-microcomputer notifies, in response to a query from the CPU 101, whether the digital broadcast receiving apparatus 1 is turned on by receiving a signal from the remote control or by the timer.

Furthermore, based on the obtained purpose of start, the CPU 101 determines whether or not the purpose of start is viewing (step S204). When the purpose of start is reception of a signal from the button provided in the main body or a remote control of the digital broadcast receiving apparatus 1, the CPU 101 determines that the purpose of start is "viewing" and determines to execute the initial control sequence. Furthermore, the CPU 101 executes the boot loader 121 so that a frequency of the last channel is read from the EEPROM 106 (step S205). Meanwhile, when the purpose of start is that the digital broadcast receiving apparatus 1 is turned on by the timer, the CPU 101 determines that the purpose of start is not "viewing" and determines not to execute the initial control sequence. Then, the subsequent processing is transited to loading of the main body program 123 (step S208) described later.

After the frequency of the last channel is read, the CPU 101 determines whether the frequency setting of the last channel is valid or invalid (step S206). For example, when the last channel is of an external input, the CPU 101 determines that the frequency setting is invalid. The last channel is a channel which was viewed by the user in the end of the previous start-up of the apparatus. When the frequency setting is valid, the frequency setting is performed on the tuner unit 107 (step S207). With the above processing, the interrupt controller 102 obtains the last channel information which was set to the tuner unit 107 immediately before the broadcast receiving apparatus 1 is started when the purpose of start of the digital broadcast receiving apparatus 1 is viewing, so that setting of the tuner unit 107 can be performed efficiently. The last channel is a channel which was viewed by the user in the end of the previous start-up of the apparatus. Furthermore, when the frequency setting is invalid, loading of the main body program 123 is stared (step S208). Then, when the loading of the main body program 123 is completed, the processing of the boot loader 121 is completed and the main body program 123 is started (step S209). Accordingly, the frequency setting of the tuner unit 107 can be performed efficiently and easily prior to the loading of the main body program 123.

Figure 4:
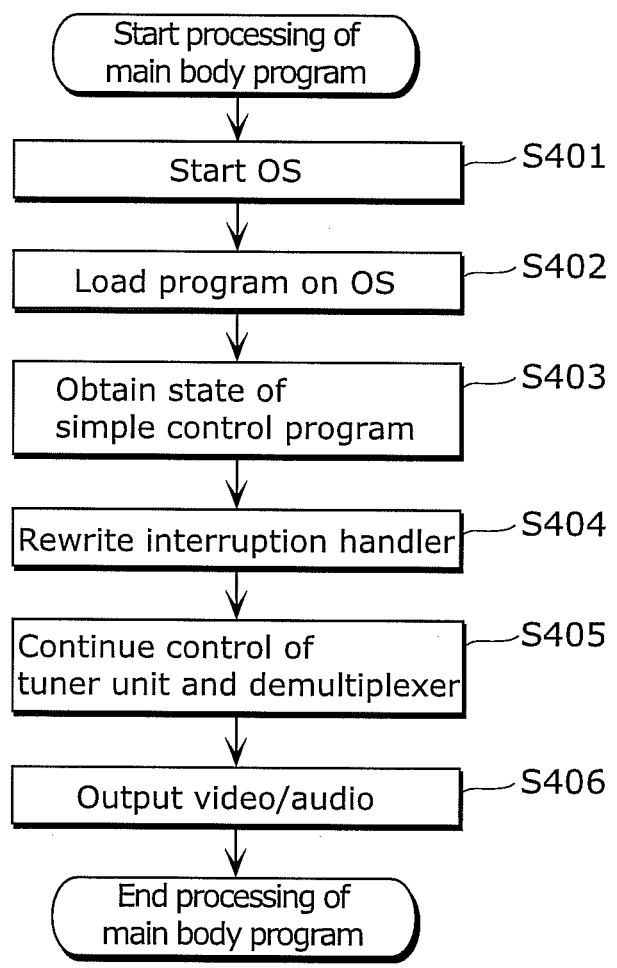
FIG. 4 is a flowchart showing processing of a main body program.

The following describes the processing of the main body program 123. FIG. 4 is a flowchart showing processing of the main body program 123, and FIG. 5 is an interrupt table for the processing of the main body program 123. Here, the interrupt table includes two tables. One is an interrupt level list 501 which holds a type of an input device and an interrupt level associated with the type. The other is a jump address list 502 which holds the interrupt level and a jump address indicating a beginning of an interrupt program associated with the interrupt level. It is to be noted that the jump address list 502 in the present embodiment corresponds to the jump address table.

As shown in FIG. 4, starting of the OS, which is the main body program 123, is started first (step S401). At this time, regarding the interrupt table, the CPU 101 rewrites the interrupt level list 301 and the jump address list 302 shown in FIG. 3 as per the interrupt level list 501 and the jump address list 502 shown in FIG. 5 (interrupt handler rewrite).

As shown in FIG. 5, in the interrupt level list 501, the tuner unit 107 and the demultiplexer 108 are assigned with the high interrupt level, while other devices are assigned with the low interrupt level. Furthermore, in the jump address list 502, an address of the simple control program 122 stored in the ROM 105 is kept as the jump address of the program for processing the interrupt for the high level interrupt, and that for the low interrupt level is set to OS. That is, the interrupt level of the devices which are disabled to interrupt, namely the decoding unit 109, the decoder unit 110, and the AV output control unit 111, are rewritten from "interrupt disabled" to "low level" by the interrupt controller 102 after the start-up of the OS. Furthermore, the jump address associated with the low level is rewritten from "N/A" to "OS" after the start-up of the OS.

With the setting of the interrupt table, the tuner unit 107 and the demultiplexer 108, which are assigned with high interrupt level, are continuously controlled through the simple control program 122 before and after the start-up of the OS. Furthermore, other devices are controlled by the OS after the start-up of the OS.

When the start-up of the OS is completed, the start-up of the application program on the OS is started (step S402). After that, a state of the simple control program 122 is obtained (step S403). Here, the following processing is executed until the steps S402 to S403 are executed.

When the tuner unit 107 completes the OFDM synchronization to the frequency of the last channel set in the step S206, the tuner unit 107 asserts an interrupt signal to the interrupt controller 102. At this time, the CPU 101 performs the processing of the interrupt table, and determines that the interrupt of the high interrupt level has occurred by referring to the interrupt level list 301 when the processing is proceeding from the step S207 to the step S208, or referring to the interrupt level list 501 when the processing is proceeding from the step S401 to the step S402.

In the table of the jump address list 302 or the jump address list 502, the jump address for the high interrupt level is set to the simple control program 122. Therefore, the simple control program 122 is executed. The simple control program 122 performs the operation shown in FIG. 6 when the processing is proceeding from the step S207 to the step S208, and performs the operation shown in FIG. 7 when the processing is proceeding from the step S401 to the step S402.

Figure 6:
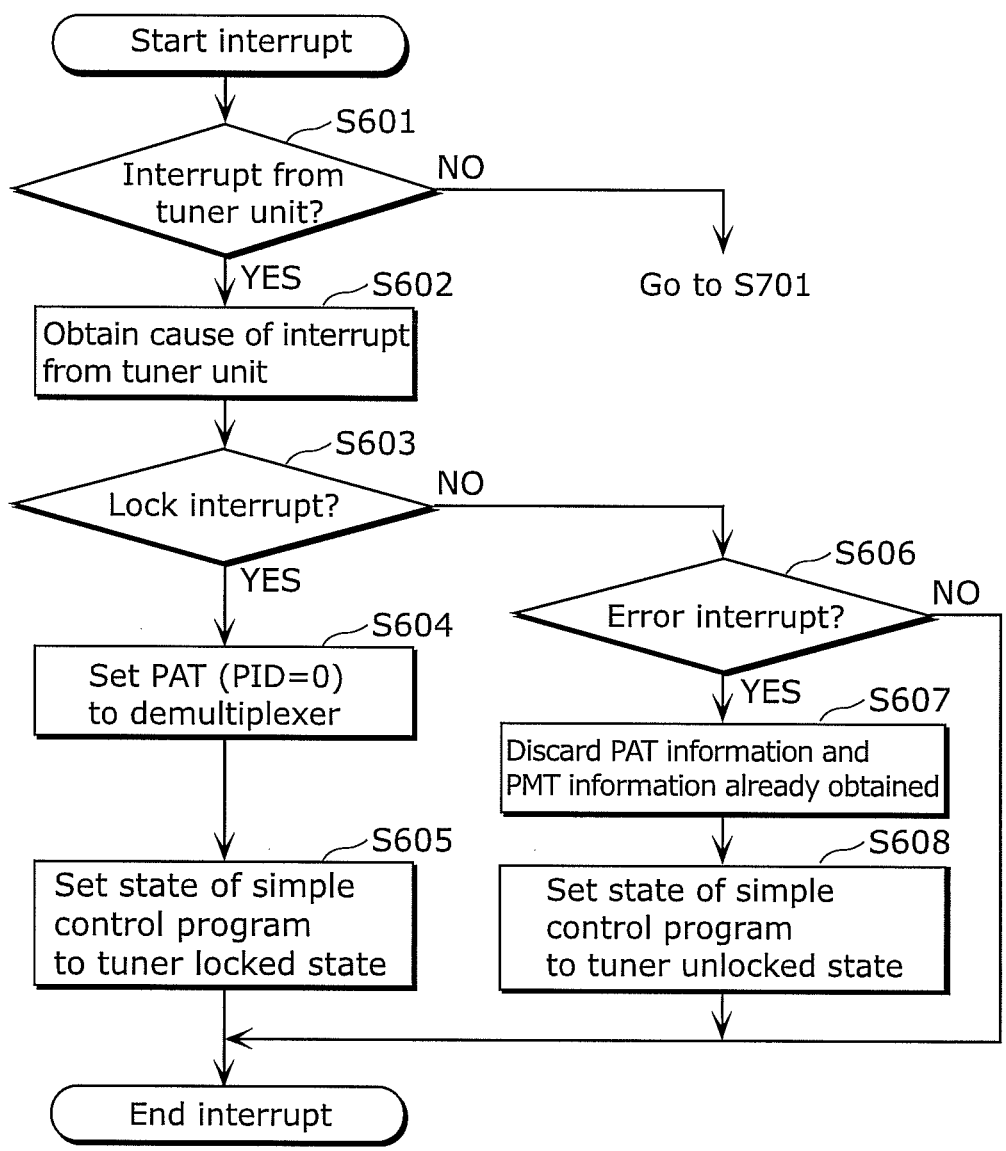
FIG. 6 is a flowchart showing processing performed by a simple control program on a tuner interrupt.
Figure 7:
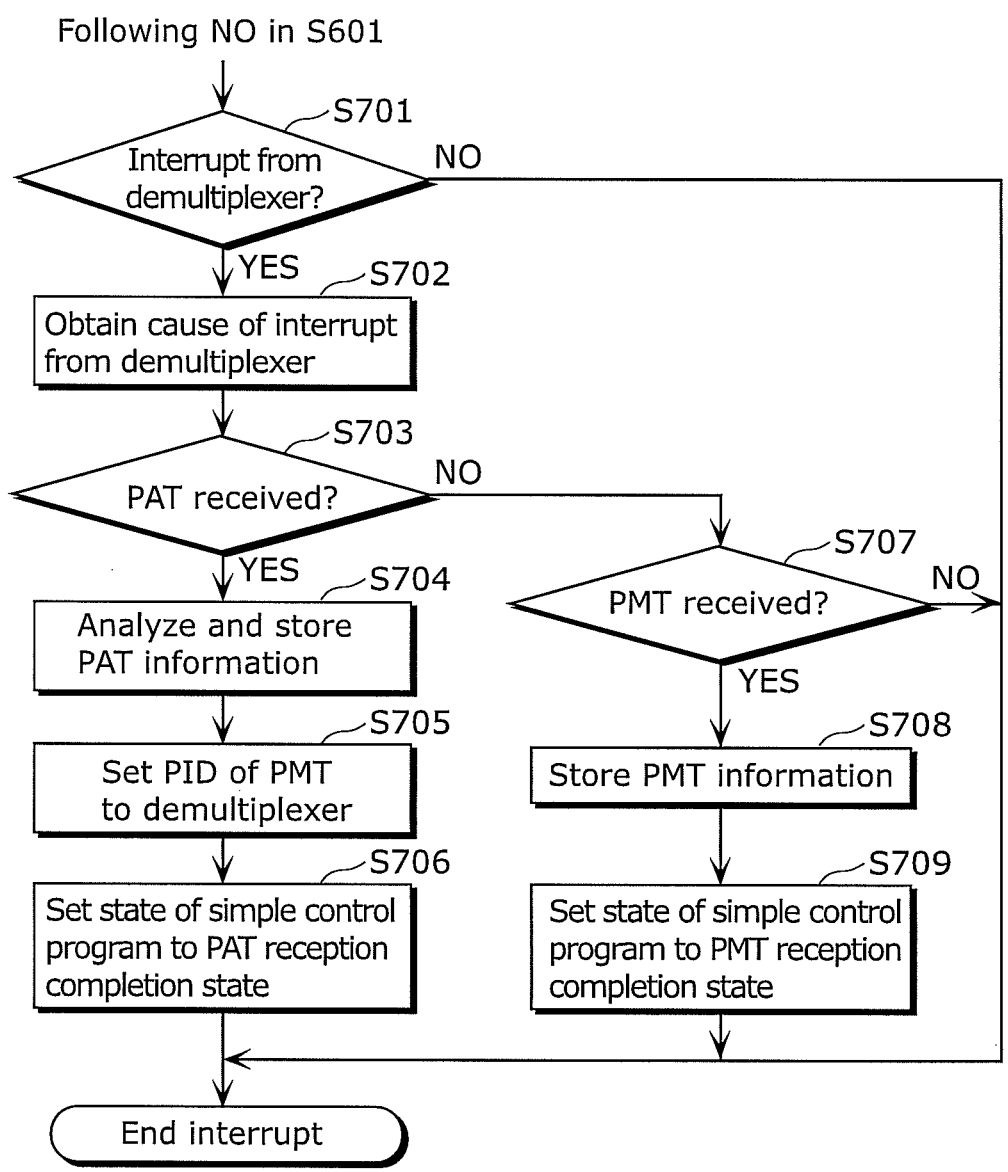
FIG. 7 is a flowchart showing processing performed by the simple control program on a demultiplexer interrupt.

FIG. 6 is a flowchart showing processing performed by the simple control program 122 on the interrupt from the tuner unit 107, and FIG. 7 is a flowchart showing processing performed by the simple control program 122 on the interrupt from the demultiplexer 108.

When the simple control program 122 is executed, as shown in FIG. 6, the CPU 101 first determines whether or not the interrupt signal is from the tuner unit 107 (step S601). When the interrupt signal is from the tuner unit 107, a tuner lock interrupt described from the steps S602 to S608 below is executed, while when the interrupt signal is not from the tuner unit 107, a processing described from the steps S701 to S709 shown in FIG. 7 is executed.

When the interrupt signal is from the tuner unit 107, the CPU 101 (i) executes the boot loader 121 so that the tuner unit 107 obtains the cause of interrupt (step S602) and (ii) determines whether or not the cause of interrupt from the tuner unit 107 is tuner lock interrupt caused by the tuner lock (completion of synchronization of the tuner unit 107) (step S603). Here, the boot loader 121 includes steps of performing the frequency setting processing on the tuner unit 107. When the cause of interrupt from the tuner unit 107 is tuner lock interrupt, the CPU 101 sets the demultiplexer 108 to receive program association table (PAT) information (PID value=0) (step S604), sets the state of the simple control program 122 to "tuner locked state" (step S605), and completes the interrupt.

Meanwhile, when the cause of interrupt from the tuner unit 107 is not the tuner lock interrupt, the CPU 101 executes the boot loader 121 so that the interrupt controller 102 determines whether or not the cause of interrupt from the tuner unit 107 is error interrupt (step S606). Here, the error interrupt represents, for example, an interrupt due to causes such as broadcast cannot be received because an antenna line has fallen, intensity of the broadcast wave is weak, or the broadcast pauses. In the case where an error has occurred, if the PAT information or program map table (PMT) information has been obtained, the interrupt controller 102 cancels the setting of PID value to the demultiplexer 108, discards the PAT or PMT information as being invalid (step S607), sets the state of the simple control program 122 to "tuner unlocked state" (step S608), and completes the interrupt.

Furthermore, when no error has occurred, the interrupt controller 102 determines that the interrupt should not be processed by the simple control program 122, and completes the interrupt.

With the above processing, in the case where an error has occurred in the tuner unit 107, the interrupt controller 102 determines that the PAT information or the PMT information which has already been obtained as being invalid, if any, so that the device can be started efficiently.

Furthermore, when the interrupt signal is not from the tuner unit 107, the CPU 101 executes the simple control program 122, and as shown in FIG. 7, the interrupt controller 102 determines whether or not the interrupt is from the demultiplexer 108 (step S701). Here, the interrupt program included in the simple control program 122 includes the following steps and is executed by the CPU 101. When the interrupt signal is from the demultiplexer 108, the interrupt controller 102 obtains the cause of interrupt from the demultiplexer 108 (step S702). Subsequently, the interrupt controller 102 determines whether or not the cause of interrupt from the demultiplexer 108 is reception of PAT information (step S703).

Here, when the cause of interrupt of the interrupt from the demultiplexer 108 is reception of PAT information, the CPU 101 analyzes the received PAT information (step S704). Furthermore, the demultiplexer 108 stores the PAT information to the RAM 104 and obtains the PID value of the PMT information from the received PAT information. Then, the CPU 101 sets the PID of the PMT information to the demultiplexer 108 (step S705), sets the state of the simple control program 122 to "PAT received state" (step S706), and completes the interrupt.

Meanwhile, when the cause of interrupt from the demultiplexer 108 is not reception of PAT information, the interrupt controller 102 determines whether or not the cause of interrupt from the demultiplexer 108 is reception of the PMT information (step S707). When the cause of interrupt is reception of the PMT information, the interrupt controller 102 stores the PMT information received by the CPU 101 to the RAM 104 (step S708), sets the state of the simple control program 122 to "PMT received state" (step S709), and completes the interrupt. Furthermore, when the cause of interrupt from the demultiplexer 108 is not reception of PMT, the interrupt controller 102 determines that the interrupt should not be processed by the simple control program 122, and completes the interrupt.

By performing the above processing, in the step S402 shown in FIG. 4, (i) loading of the main body program 123 and (ii) locking of the tuner and receiving of the PAT information and the PMT information while the OS and the application on the OS are started can be executed in parallel. Thus, waiting for the completion of synchronization of the tuner unit 107 and receiving of the PAT and PMT information from the demultiplexer 108 can be executed by the interrupt in parallel with the start-up of the OS and, the program on the OS. Furthermore, since control of the tuner unit 107 and the demultiplexer 108 which is being executed by the interrupt can be executed continuously from the program on the OS, the waiting time after the user has turned on the apparatus to actually start viewing can be shortened. Furthermore, the control of the tuner unit 107 and the demultiplexer 108 and the control of other devices can be integrated by succeeding the control with the program on the OS, so that the control can be performed in a flexibly coordinated manner after the start-up of the program on the OS.

After the loading of the main body program 123 and the start-up of the OS and the application on the OS, an application programming interface. (API) for obtaining a state from the started application on the OS is called, and a processing state of the simple control program 122 is obtained by the application on the OS (step S403).

FIG. 8 is an interrupt table set after the start-up of the OS and the application on the OS. Here, the interrupt table is both of the interrupt level list 801 and the jump address list 802.

After the processing state of the simple control program 122 is obtained by the application on the OS, the interrupt controller 102 rewrites the interrupt level list 501 and the jump address list 502 shown in FIG. 5 as per the interrupt level list 801 and the jump address list 802 shown in FIG. 8 (interrupt handler rewrite).

As shown in FIG. 8, in the interrupt level list 801, the tuner unit 107 and the demultiplexer 108 are assigned with the low interrupt level, and other devices are assigned with the low interrupt level. Furthermore, in the jump address list 802, a jump address of a program for processing the interrupt for the high interrupt level is not specifically stated, and that for the low interrupt level is kept as OS. Specifically, the interrupt levels of the tuner unit 107 and the demultiplexer 108 which have been represented as "high level" are rewritten from "high level" to "low level" by the interrupt controller 102, after the start-up of the application on the OS. Furthermore, the jump address assigned to high level is rewritten from "simple control program" to "(don't care)" after start-up of the application on the OS (step S404).

With the above setting of the interrupt table, the interrupt levels of all of the devices are "low level", and therefore all of the interrupts from the devices are controlled by the OS. The devices include the tuner unit 107, the demultiplexer 108, the decoding unit 109, the decoder unit 110, and the AV output control unit 111.

Next, a control application on the OS performs, on the tuner unit 107 and the demultiplexer 108, the subsequent processing to be performed as a result of determination of the processing state of the simple control program 122 (step S405). For example, setting of the PID value of the Video/Audio to the demultiplexer 108, setting of ECM to the decoding unit 109, control of the decoder unit 110, and control of the AV output control unit 111 are executed, and then Video/Audio is started to be output (step S406).

As described above, in the present embodiment, control of the devices is started through the boot loader 121 prior to the loading of the OS and the devices are controlled by the interrupt driving unit, so that the start-up of the OS and the program on the OS can be executed in parallel with the control of the devices. The devices include the tuner unit 107 and the demultiplexer 108, for example. Moreover, the interrupt controller (i) receives, through the program on the OS, the interrupt level and the jump address and (ii) rewrites the interrupt table to succeed the processing, so that it is possible to (i) shorten the waiting time after the user turns on the apparatus to start viewing and (ii) continuously execute the device control from the OS. The interrupt level is a parameter for the device control and the jump address is the program of the control source.

In other words, the digital broadcast receiving apparatus 1 can, with at least one control microcomputer (CPU 101), (i) perform the frequency setting of the tuner through the boot loader 121, (ii) execute waiting for the completion of synchronization of the tuner unit 107 and receiving of the PAT and PMT information from the demultiplexer 108 by the interrupt in parallel with the start-up of the OS and the program on the OS, and (iii) execute the control of the tuner unit 107 and the demultiplexer 108 which is being executed by the interrupt driving unit continuously from the program on the OS. Thus, the waiting time after the user has turned on the apparatus to actually start viewing can be shortened.

Furthermore, since the control of the tuner unit 107 and the demultiplexer 108 and the control of other devices (the decoding unit 109, the decoder unit 110, and the AV output control unit 111, for example) can be integrated by succeeding the control with the program on the OS, the control can be performed in a flexibly coordinated manner after the start-up of the program on the OS.

Since the application on the OS obtains the processing state of the simple control program 122 even in an unusual situation, such as the tuner synchronization cannot be completed and the PAT information or the PMT information cannot be received because the intensity of wave is weak or the antenna line has fallen during the start-up, the processing such as displaying an error on the screen can be executed promptly.

Moreover, in the control of the demultiplexer 108 through the simple control program 122, it is easy to add processing of a transport (TS) packet other than the PAT information and the PMT information. The digital broadcast receiving apparatus 1 is applicable to receiving of, for example, network information table (NIT) information, conditional access table (CAT) information, and entitlement management message (EMM) information.

Moreover, it is easy to limit the target to be controlled by the simple control program 122 to the tuner unit 107 only or extend the target to the decoding unit 109, the decoder unit 110, and the AV output control unit 111, by extending the configuration of the present invention.

Furthermore, when it was an external input that the user viewed in the end of the time that the apparatus was previously turned on, the boot loader 121 is caused not to set the frequency to the tuner unit 107, and therefore the power consumption by the tuner unit 107 can be reduced.

Moreover, when the start-up does not require start-up of the tuner unit 107, such as the start for a firmware update, or when the start-up does not require to be performed fast because the apparatus is turned on by the timer, the boot loader 121 does not set the frequency to the tuner unit 107, so that the power consumption by the tuner unit 107 can be reduced.

It is to be noted that the present invention is not determined by the above described embodiment and may be varied or modified without departing from the spirit of the present invention.

For example, although the control apparatus has been described using the digital broadcast receiving apparatus as an example in the above embodiment, the present invention may be used for a control apparatus other than the digital broadcast receiving apparatus.

Furthermore, the control apparatus according to the present invention includes other embodiments achieved by combining arbitrary constituents in the above embodiment, modification examples obtained by applying various modifications conceived by those skilled in the art to the above embodiment within a scope that does not deviate from the spirit of the present invention, and various devices including the digital broadcast receiving apparatus or the control apparatus according to the present invention. For example, a digital broadcast receiving system including the digital broadcast receiving apparatus according to the present invention is also included in the present invention.

Although only an exemplary embodiment of the present invention has been described in detail above, those skilled in the art will readily appreciate that many modifications are possible in the exemplary embodiment without materially departing from the novel teachings and advantages of the present invention. Accordingly, all such modifications are intended to be included within the scope of the present invention.

INDUSTRIAL APPLICABILITY

The present invention is applicable to a device which serves as a digital broadcast receiving apparatus, especially a TV, a video recorder, a mobile phone, and a personal computer, and is a technique effective in shortening the waiting time after the device is turned on to output video/audio.

The invention claimed is:

1. A control apparatus comprising:
a control microcomputer;
at least one device connected to the control microcomputer; and
a ROM which stores a first control program, a second control program which is used for controlling the control microcomputer, and a boot loader program for loading the second control program into the control microcomputer upon start-up;
wherein the first control program includes an interrupt program having an interrupt for starting the at least one device so that the at least one device is activated, and
the control microcomputer executes the boot loader program so that the second control program is loaded from the ROM, accepts an interrupt signal requesting for the interrupt from the at least one device during the loading of the second control program, and performs the interrupt.

2. The control apparatus according to claim 1,
wherein the control microcomputer includes an interrupt driving unit configured to accept the interrupt signal from the at least one device,
the at least one device transmits the interrupt signal to the interrupt driving unit, and
the interrupt driving unit is configured to, after receiving the interrupt signal, call the interrupt program and cause the control microcomputer to perform the interrupt program.

3. The control apparatus according to claim 2,
wherein the control microcomputer executes the boot loader program so that the interrupt signal can be received after setting an interrupt address table which holds a jump address indicating a beginning of the interrupt program.

4. A digital broadcast receiving apparatus comprising:
the control apparatus according to claim 1; and
at least one device from among a tuner unit, a demultiplexer, a decoding unit, a decoder unit, and an audio/video (AV) output control unit, as the at least one device.

5. The digital broadcast receiving apparatus according to claim 4,
wherein the second control program is at least one of an operating system and a program which runs on the operating system.

6. The digital broadcast receiving apparatus according to claim 4,
wherein the boot loader program includes frequency setting to the tuner unit.

7. The digital broadcast receiving apparatus according to claim 4,
wherein the at least one device to be activated by the execution of the interrupt program is the tuner unit and the demultiplexer, and
the interrupt program includes:

when an interrupt signal is outputted from the tuner unit and a cause of interrupt is completion of tuner synchronization, setting a packet identifier (PID) for receiving a program association table (PAT) to the demultiplexer;
when an interrupt signal is outputted from the demultiplexer and a cause of interrupt is reception of the PAT, storing the PAT and setting PID of a program map table (PMT) described in the PAT to the demultiplexer; and
when an interrupt signal is outputted from the demultiplexer and a cause of interrupt is reception of the PMT, storing the PMT.

8. The digital broadcast receiving apparatus according to claim 7,
wherein the interrupt program includes,
when a cause of interrupt from the tuner indicates an error, cancelling the setting of the PID to the demultiplexer.

9. The digital broadcast receiving apparatus according to claim 4,
wherein the boot loader program includes:
obtaining a purpose of start of the control apparatus;
when determining that the purpose of start is viewing, obtaining last channel information that is set in the tuner unit immediately before the start-up of the tuner unit; and
when determining that the purpose of start is not viewing, loading the second control program.

10. The digital broadcast receiving apparatus according to claim 9,
wherein the boot loader program includes steps including:
upon obtaining of the last channel information of the tuner unit, determining whether a predetermined frequency setting is valid or invalid, the predetermined frequency setting being included in the last channel information and being to be set in the tuner unit;
when determining the frequency setting of the tuner unit as being valid, setting the predetermined frequency to the tuner unit; and
when determining the frequency setting of the tuner unit as being invalid, loading the second control program.

11. A method of controlling a control apparatus including a control microcomputer, at least one device connected to the control microcomputer, and a ROM which stores a first control program including an interrupt program having an interrupt for starting the at least one device so that the at least one device is activated, a second control program which is used for controlling the control microcomputer, and a boot loader program for loading the second control program into the control microcomputer upon start-up, the method comprising:
executing the boot loader program so that the second control program is loaded, the executing being performed by the control microcomputer; and
accepting an interrupt signal requesting for the interrupt from the at least one device during the loading of the second control program and causing the control microcomputer to process the interrupt.

12. The method of controlling the control apparatus according to claim 11, comprising:
transmitting the interrupt signal requesting for the interrupt to an interrupt driving unit provided in the control microcomputer, the transmitting being performed by the at least one device; and
calling the interrupt program and causing the control microcomputer to process the interrupt, the calling and causing being performed by the interrupt driving unit which has received the interrupt signal.

* * * * *